United States Patent [19]

Michalchik

[11] Patent Number: 4,745,301

[45] Date of Patent: May 17, 1988

[54] PRESSURE SENSITIVE ELECTRO-CONDUCTIVE MATERIALS

[75] Inventor: Michael Michalchik, Los Altos, Calif.

[73] Assignee: Advanced Micro-Matrix, Inc., Altadena, Calif.

[21] Appl. No.: 809,075

[22] Filed: Dec. 13, 1985

[51] Int. Cl.[4] .................... G01H 35/00; H01C 10/10; H01B 1/06

[52] U.S. Cl. .................................... 307/119; 338/99; 252/511

[58] Field of Search .......................... 307/119; 200/5; 428/246, 256, 325; 252/510-512; 338/99, 100, 113, 114

[56] References Cited

U.S. PATENT DOCUMENTS

| | | | |
|---|---|---|---|
| 2,457,962 | 1/1949 | Whaley | 260/766 |
| 3,544,507 | 12/1970 | Lloyd | 260/39 |
| 3,745,118 | 7/1973 | Brynko | 252/62.1 |
| 3,844,811 | 10/1974 | Brynko | 106/309 |
| 4,054,540 | 10/1977 | Michalchik . | |
| 4,103,066 | 7/1978 | Brooks et al. | 428/337 |
| 4,120,828 | 10/1978 | Michalchik | 525/513 |
| 4,133,774 | 1/1979 | Brynko et al. | 252/62.1 D |
| 4,220,698 | 9/1980 | Brynko et al. | 430/109 |
| 4,258,100 | 3/1981 | Fujitani et al. | 428/315 |
| 4,265,789 | 5/1981 | Christopherson et al. | 252/511 |
| 4,273,697 | 6/1981 | Sumimura et al. | 252/511 |
| 4,301,040 | 11/1981 | Berbeco | 252/511 |
| 4,314,227 | 2/1982 | Eventoff | 338/99 |
| 4,315,238 | 2/1982 | Eventoff | 338/99 |
| 4,347,505 | 8/1982 | Anderson | 340/666 |
| 4,375,493 | 3/1983 | George et al. | 428/246 |
| 4,441,097 | 4/1984 | Anderson | 340/365 |
| 4,451,714 | 3/1984 | Eventoff | 200/5 A |
| 4,469,747 | 9/1984 | Sasaki et al. | 428/325 |
| 4,489,302 | 12/1984 | Eventoff | 338/99 |
| 4,510,079 | 4/1985 | Kawai et al. | 252/511 |
| 4,518,648 | 5/1985 | Miyata et al. | 428/256 |
| 4,587,039 | 5/1986 | Yamaoka et al. | 252/511 |

OTHER PUBLICATIONS

"Electrodag Coatings Selection Guide" Acheson Colloids Company, Port Huron, MI 48060.

"Cord Switch" (Brochure) Bridgestone Corporation, Tokyo, Japan.

"Cord Swtich, A New Safety Sensor, Features Quick Reaction, Durability" (News Release) Bridgestone Corporation, Los Angeles, CA 90036.

*Primary Examiner*—Vit W. Miska
*Attorney, Agent, or Firm*—Christie, Parker & Hale

[57] ABSTRACT

A pressure sensitive electro-conductive material which can be utilized as a pressure sensitive electro-conductive switch or as a variable resistor. The switch comprises two electrodes with a deformable pressure sensitive electro-conductive material sandwiched between the electrodes. The electro-conductive material comprises a deformable elastomeric material impregnated with a plurality of electro-conductive micro-agglomerates of unbound finely divided electro-conductive carbon particles enclosed by a matrix of the elastomeric material and finely divided electro-conductive carbon particles bound together by the elastomeric material.

9 Claims, 5 Drawing Sheets

PRESSURE SENSITIVE ELECTRO-CONDUCTIVE MATERIALS

FIELD OF THE INVENTION

This invention relates to a pressure sensitive electro-conductive material which becomes more conductive, that is, less resistant to electrical current, when pressure, i.e. a force, is applied to the material.

BACKGROUND OF THE INVENTION

A number of prior art products have been made which are conductive and flexible. These products include materials made by drying and polymerizing dispersions of conductive carbon in a binder of elastomer. In a number of the prior art products, the carbon is wetted and ground to a fine paste which is mixed with a polymeric binder. The resulting composition is dried and cured to form a conductive, flexible material. The conductive carbon is ground to submicroscopic size using higher shear methods. The bulk of carbon is reduced to a size below 0.1 micrometers. Such finely ground carbon appears as a brown haze in the microscope. The carbon "grind" prepared by conventional mixing is considered unsatisfactory because the carbon particles are intimately adsorbed to the binder and conductivity is achieved only with an excess of carbon resulting in a randomly mixed bulk composition of poor pressure-conductive properties. In an alternative prior art process, the carbon particles are dispersed dry in a semi-solid prepolymer or monomer under high shear by milling action, and the mixture is cured and solidified to form a conductive rubber which shows conductivity but poor pressure-conductive characteristics.

The prior art conductive rubbers require a high carbon loading and sufficient binder to maintain an integral structure of the conductive rubber. Silicon rubber with dispersed conductive carbon is an example of such a conductive rubber. Because of the required high carbon loading, conventional conductive rubbers do not possess strong integrity and are cast into thin sheets. It is especially difficult to coat and difficult to obtain pressure sensitive coatings with prior art conductive rubbers.

Most of the conventional conductive rubbers upon the application of pressure or mechanical force do not exhibit a significant, if any, change in electrical resistance. Such material is treated and used as a fixed resistance material. Expensive shaping and specially designed electrodes are required to produce pressure sensitive electro-conductive devices from conventional conductive rubber. Thus, direct application of the conventional conductive rubbers does not result in a useful force discriminating sensor which can sense beyond opened/closed positions. Moreover, the conventional conductive rubbers cannot be used in touch feed-back systems and directly monitored switches which indicate closed circuits with open switches. Where a surface is roughened and formed into irregular geometry, the function of sensitivity with pressure is limited and difficult to control.

My U.S. Pat. No. 4,054,540 is directed to an electric resistant element sensitive to pressure comprising a substantially discontinuous phase of metallic conducting particles in a matrix of a cured elastomeric resin. The metallic conducting particles are coated with a deformable, semi-conducting compound. The element has a high loading of metal conducting particles to resin of from 75:100 to 110:100 by weight.

My U.S. Pat. No. 4,120,828 is directed to finely divided metal particles coated with a deformable, electrically semi-conductive compound. The particles can be employed in an electric resistant element which is sensitive to pressure.

U.S. Pat. No. 4,258,100 is directed to a pressure sensitive electric-conductive sheet material comprising at least one layer of rubbery elastic material and an adhesive layer disposed on at least one of the surfaces of the sheet. Both layers having substantially uniform distributed fine particles of electric conductive metal. The particle size of the fine metal particles is from 10-1000 mesh and the loading of the sheet material of metal particles to the rubbery elastic material is 10:100 to 800:100 by weight.

SUMMARY OF THE INVENTION

The present invention is directed to a deformable pressure sensitive electro-conductive switch comprising first and second electrodes and a deformable pressure sensitive conductive film sandwiched between the first and second electrodes. The film comprises an elastomeric composition impregnated with electrically conductive micro-agglomerates of finely divided unbound carbon particles.

The electrically conductive micro-agglomerates of unbound finely divided carbon particles are enclosed in a matrix of finely divided carbon particles bonded together by an elastomeric composition. The micro-agglomerates are roughly spherical shaped and have a maximum dimension of between about 0.1 and about 10 microns; preferably between about 0.3 and 2 microns.

The deformable pressure sensitive conductive material is prepared by a process comprising the steps of:

(a) preparing a solvent system comprising water, a water-miscible, carbon-wetting organic solvent and a surfactant, (b) dispersing finely divided carbon into the solvent system to form a uniform slurry, (c) allowing the slurry to soak until the external surface of substantially all the carbon particles are wetted by the solvent system to form a pre-agglomeration composition (d) ultrasonically dispersing the pre-agglomeration composition into an elastomeric-carbon composition to form an elastomeric composition containing electrically conductive micro-agglomerates.

The pressure sensitive electro-conductive material has a relatively high resistance (or low conductance) at rest, that is, when not pressed or subject to a force, and a lower resistance when subject to pressure. The material is sensitive to forces as low as one ounce per square inch or less and as high as 100 pounds, or higher, per square inch. For example, the material has been used to detect the removal or placement of a quarter coin and the encroachment of pets and adults on a 3 square foot area.

The pressure sensitive electro-conductive material of the present invention can be utilized to make pressure sensitive switches for alarm systems, detection systems, counting systems, safety systems and the like. For example, a switch can be made by sandwiching the material between two electro-conductive electrodes attached to a detection system having a voltage source, and signalling unit such as a light, bell, horn or the like. The switch could be applied to a floor or platform to detect the presence of an object, such as a person, vehicle, cart or box, when the object encroaches, rolls over, or rests on the switch to complete the circuit between the electrical supply and the signalling element. Similarly, the switch can be applied to dangerous areas around machinery and connected to a shut-off device for the machinery. In the event someone encroaches a danger area, the weight of the person closes the switch, that is, makes the switch more conductive, to complete the circuit between the switch and the shuf-off device to stop the machinery. Similarly, the switches can be used to determine when a door is closed or opened by placing a switch between the hinge plates of a door to compress or squeeze the switch when the door is closed to complete the circuit in a detection system. The switch can also be used as a transducer in a weighing device since conductivity of the switch changes with the applied force over a wide range of force.

The material has a threshold pressure at which point its conductivity will increase with increasing pressure placed on the material. The responsive characteristics of the material has an upper conductivity limit. When the upper conductivity limit is reached, further pressure on the material will not increase the conductivity. The conductivity range is relatively broad and the material can be calibrated to function as a transducer for weighing systems. In addition, the material can be utilized as a variable resistor, the resistivity of which can be altered by applying or removing force from the material. Thus, the material can be employed as a variable resistor in a wheatstone bridge type circuit to alter the response range of the circuit.

The pressure sensitive electro-conductive switches can be utilized as a control means in an electrical apparatus for carrying out a pre-determined operation that is at least partically controlled by a pressure sensitive electro-conductive switch comprising:

electrical powered output means for powering a system of said apparatus;

voltage source for energizing said electrical powered output means;

pressure sensitive electro-conductive switch means connected to said electrical powered output means and said voltage source to switch the flow of electrical current from said voltage source to said electrical powered output means to carry out a pre-determined operation, said switch means comprising first and second electrodes, and a deformable pressure sensitive electro-conductive material sandwiched between said first and second electrodes, said material comprising a matrix of an elastomeric material and electrically conductive micro-agglomerates, wherein the micro-agglomerates comprise unbound finely divided electro-conductive carbon particles enclosed by the elastomeric material and finely divided electrically-conductive carbon particles bound together by the elastomeric materials.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION

Figure 1:
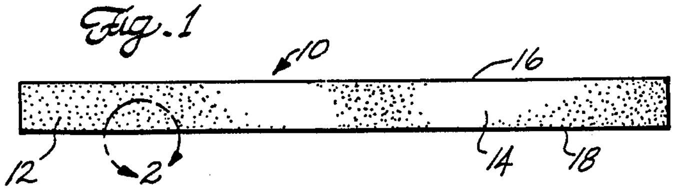
FIG. 1 is a schematic cross-section of the pressure sensitive electro-conductive material of the present invention.

Referring to FIG. 1, a pressure sensitive electro-conductive material 10 provided in accordance with principles of this invention is shown.

The term "pressure sensitive electro-conductive" as used herein means that the material is less conductive in the normal state, i.e. the non-press state, than when a force or pressure is applied thereto. The material 10 comprises a plurality of micro-agglomerates 12 of unbound finely divided carbon particles dispersed in a layer of rubbery elastomeric material 14. The micro-agglomerates 12 comprise finely divided carbon particles enclosed in a matrix of finely divided carbon particles bonded together by the elastomeric material. The agglomerates can be visualized as very small voids in the elastomeric composition containing a large number of unbound finely divided carbon particles. The surface or wall of the void is the bonded matrix of carbon particles.

Not intending to be bound by theory, it is believed that when a force is applied to the two opposing greater surfaces 16 and 18 of the pressure sensitive electro-conductive material, that is, when the matrix is compressed, the electrically conductive micro-agglomerates 12 are compressed and thereby deformed forcing the unbound finely divided carbon particles into close proximity enhancing the conductivity across the micro-agglomerates. Each micro-agglomerate is in close proximity to at least one other micro-agglomerate. Thus, when a compressive force is applied to a portion or all of the pressure sensitive electro-conductive material, a conductive pathway is established between the two opposing greater surfaces 16 and 18 of the material. The more pathways that are established, the greater is the conductivity of the material.

A unique feature of the pressure sensitive, electro-conductive composition of the present invention is that the resistivity response is both force and area dependent. For example, the resistivity of a film will be different for a force of 10 pounds applied to 1 square inch than for a force of 40 pounds applied to 4 square inches or a force of 60 pounds applied to 6 square inches (See FIGS. 6, 7 and 8 and Examples 6, 9 and 10). This response is not due to inconsistencies in the film; a unit of force applied to a unit of area at any location on the film will give substantially the same change in resistivity. It has been found that for a given current and applied force, the resistivity decreases with increasing area (See FIGS. 6, 7 and 8). A discriminating detector element can be prepared from the composition employing this unique property. The discriminating detector can discriminate between objects of a given weight with different base area, such as a 100 pound crate with a foot square base and a 100 pound table with four legs each having a one square inch base.

Another unique feature of the present invention is that the resistivity response is ampreage dependent. For example, the resistivity of a film is different for a 100 nanoamp signal than a 100,000 nanoamp (100 microamp) signal (See FIG. 8 and Example 9). Thus the resistivity response range of a detector utilizing the composition can be altered by increasing or decreasing the signal amperage.

Films of the pressure sensitive, electro-conductive composition can conduct signals having potentials of between about 0.2 and about 25 volts and currents of between about 10 nanoamps and 1 milliamp. However, the films can be utilized in circuits having lower or higher signal potentials and/or lower signal currents. Utilization of signal currents exceeding 5 milliamps is not recommended unless the signals are of short duration and/or the film is adequately cooled to remove the heat generated in the film by high current signals, and/or the conduction cross-sectional area is large, for example 6 square inches per 1 milliamp.

The elastomeric composition is an elastic, rubbery, deformable material prepared from natural rubbers, synthetic rubbers or synthetic plastic materials. These materials include natural rubber, isoprene rubber, styrene butadiene rubber, butadiene rubber, chloroprene rubber, nitrile rubber, butyl rubber, ethylenepropylene rubber, chlorinated polyethylene, styrene, butadiene block copolymer, plasticized polyvinyl chloride, polyurethane and the like. Preferably the elastomeric material is polyurethane.

The carbon particles making up the electro-conductive micro-agglomerates are conductive carbon block such as electrically-conductive oil-furnace carbon black and the like. The carbon particles have a particle size of about 10 millimicrons to 100 millimicrons, preferably about 15 millimicrons to 75 millimicrons. Conductive carbon black of less than 10 millimicrons can be used; however, conductive carbon particles of such size are generally not commercially available. Carbon particles larger than 100 millimicrons have not been found to be satisfactory in the practice of the present invention because they do not form satisfactory micro-agglomerates. Conductive carbon blacks are differentiated from other carbon blacks by their high surface area (about 100 to about 2000 meters per gram) and low volatile content (about 1.0 to about 3.0 percent by weight).

The electro-conductive micro-agglomerates are prepared by preparing a solvent system of water, a surface active agent and a water miscible, carbon-wetting organic solvent.

The choice of surfactant is not critical to the invention. Water soluble anionic, cationic, nonionic, or amphoteric surfactants may be employed; however, nonionic surfactants are preferred since they are more strongly absorbed on the surface of electro-conductive carbon particles than other surfactants. Examples of anionic surfactants that can be employed include the alkylaryl ethers of polyethylene glycol and the pluronic F108 and L62 surfactants of BASF Wyandotte Corporation.

The organic solvent must be miscible in water, soluble in the surfactant, able to wet the surface of the carbon and able to form a separate phase in which the carbon remains as a stable agglomerate when the carbon slurry is dispersed into an elastomeric composition as described herein. Examples of solvents that can be employed in the present invention include the glycol ethers, water-soluble esters, water-soluble polyethylene glycols, water-soluble organic amines and water-soluble polar solvents such as dimethyl sulfoxide and dimethyl formamide. Examples of glycol ethers that can be used in the solvent system include methyl, ethyl, butyl and higher ethers and dimethyl, diethyl and dibutyl ethers of ethylene glycol, diethylene glycol, triethylene glycol, propylene glycol, dipropylene glycol and tripropylene glycol. Diethylene glycol butyl ether has been the solvent of choice.

For pH control, a small amount of water soluble basic material may be added to the solvent system to counteract the pH effect of the carbon particles. Typical bases that can be employed include sodium metasilicate, methyl diethanol amine, sodium hydroxide, sodium carbonate and the like.

The solvent system preferably comprises, by weight percent, from about 2.0 to about 15 percent of a water immiscible, carbon-wetting organic solvent, from about 0.05 to about 1.0 percent of a surfactant and the balance substantially water. Preferably sufficient organic solvent is employed to function as film former during the drying stage of the elastomeric-carbon composition described herein. It has been found that if the solvent system contains less than 2 percent by weight of an organic solvent, the formation of micro-agglomerates is adversely affected, and the solvent has little, if any, film former action. It has been found that if the solvent system contains more than one percent by weight of a surfactant, the micro-agglomerates have a tendency to break into a conductive network during film formation and form a non-pressure sensitive film of the elastomeric-carbon composition described herein.

After the constituents of the solvent system have been dissolved, the electro-conductive carbon particles are added to the solvent system to form an electro-conductive carbon slurry. The slurry can contain from about 7.5 to about 20% carbon by weight. It has also been observed that if the solvent system contains less than 0.05% by weight of a surfactant, the micro-agglomerates are not formed as described herein. The slurry can contain less than 7.5% by weight carbon; however, a slurry with a low carbon loading will produce a pressure sensitive electro-conductive material with a much higher at rest resistance than a material prepared from a slurry containing between about 7.5 and about 20% by weight carbon. The slurry is allowed to stand or soak for at least one day, preferably from about 3 to about 7 days, in order that the external surface of the carbon particles may be fully wetted by the solvent system. To enhance the wetting action, the slurry can be stirred and/or heated. However, it has been found that the wetting action will occur with time without stirring or heating. The carbon particles have a complex surface and to improve control of the surface, a basic material is added. If the surface is acidic, the pH of the slurry or paste is adjusted to between about 7 and about 10 by the addition of a basic material to the solvent system to avoid breaking the binder emulsion.

The wetting action on the carbon particles is crucial to the preparation of electro-conductive micro-agglomerates. If the surfaces of the carbon particles are not sufficiently wetted, the resulting electro-conductive carbon slurry, when added to an aqueous elastomeric composition, will not form the desired electro-conductive micro-agglomerates. The slurry is uniformly dispersed into the elastomeric composition to form the electro-conductive carbon micro-agglomerates.

Figure 2:
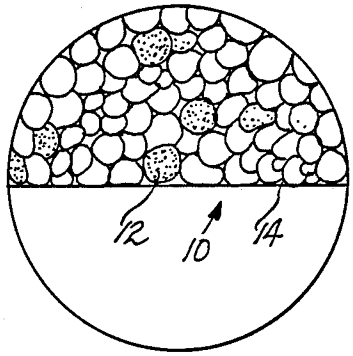
FIG. 2 is an enlarged cross-section of the pressure sensitive electro-conductive material of the present invention.

Referring to FIG. 2, which is an enlarged cross section of the electro-conductive material shown in FIG. 1, it can be seen that the material is composed of the elastomeric composition 14 impregnated with a plurality of micro-agglomerates 12. Several micro-agglomerates 12 are speckled to illustrate the free, unbound, finely-divided carbon particles contained therein; all micro-agglomerates 12 contain free, unbound, carbon particles. The elastomeric composition 14 occupies the space between the micro-agglomerates 12. The micro-agglomerates, which are generally spherical, have a diameter of from about 0.1 to about 10 microns, preferably from about 0.3 to about 2.0 microns.

It has been observed that if the micro-agglomerates are larger than 10 microns the agglomerates tend to break when the elastomeric-carbon composition is coated onto a substrate. When the agglomerates break, the carbon particles within the agglomerate disperse into the elastomeric composition and, frequently, form conductive pathways between the two greater opposing surfaces of the film. Such conductive pathways can short circuit the material. It has been found that if the agglomerates are of less than 0.1 micron, the material has poor action or pressure sensitivity, and a low at rest conductance. The best materials prepared have micro-agglomerates of an average size between about 0.3 and about 2.0 microns.

As explained herein, the size of the micro-agglomerates is primarily controlled by the surfactant and solvent concentration of the solvent system and the pH of the carbon slurry. The preferred size of the micro-agglomerates were formed when the solvent system contains between about 2.5 and about 3 percent by weight of the solvent and between about 0.05 and about 0.25 percent by weight of the surfactant. Higher concentrations of solvent and/or surfactant tend to reduce the formation of discrete micro-agglomerates. For preparation of the preferred size micro-agglomerates, the pH of the electro-conductive slurry is adjusted to between about 7 and about 10.

The aqueous elastomeric composition or binder may be conventional elastomeric suspensions, dispersions, emulsions, or latexes which form deformable elastic rubbery films, such as aqueous polyurethane dispersions, styrene-butadiene polymer dispersions, neoprene latexes, and aqueous aliphatic urethane dispersions. Preferably elastomeric compositions with fine dispersions of polymeric components are utilized. Optionally, aqueous pigment dispersants, anti-foam agents and thickener agents may be formulated into the elastomeric composition.

The polymeric solids loading of the elastomeric composition is not critical and can be from about 10% to about 50% or more by weight, preferably from about 25% to about 35%.

The shelf stability of the elastomeric-carbon composition is improved if the final composition has a pH of between about 5 and about 10. The pH of the elastomeric composition can exceed 10. However, the pH should not be increased to a point where the stability of the elastomeric composition or the micro-agglomerates in the elastomeric-carbon composition is affected. The pH of the elastomeric composition should be maintained above about 5, otherwise the stability of the micro-agglomerates and stability of the elastomeric latex is adversely affected, and the final product, the pressure sensitive electro-conductive material, may be hydroscopic which will effect the conductance of the material.

The elastomeric-carbon composition should be balanced as a formulation so that during drying, a uniform film is formed of good strength having good bonding properties to a conductive surface if coated on such a surface.

Frequently, the final composition will require the addition of a base to adjust the pH. Conventional water soluble bases, such as ammonium hydroxide, potassium hydroxide, or methyl diethanol amine and the like can be added to the composition.

The electro-conductive carbon slurry is dispersed into the aqueous elastomeric composition by conventional dispersion means, such as mechanical mixers, ultra-sonic dispersers, and the like. It has been found that ultra-sonic dispersion is particularly well adapted for dispersion of the electro-conductive carbon slurry into the elastomeric composition.

If desired, other ingredients or additives may be added to the composition, such as pigments, dyes, stabilizers, fillers, catalysts, flame retardants, plasticizers, surfactants, release agents and other additives. In addition, crosslinking or vulcanizing agents, vulcanization assistant agents, vulcanization accelerators, or the like, well known in the elastomeric film industry, can be added to the composition.

Typically, about 20 to about 40 lbs. of carbon slurry or paste will be added to each 100 lbs. of elastomeric composition to form the elastomeric-carbon composition. The elastomeric-carbon composition preferably contains from about 3.5% to about 6% by weight electro-conductive carbon and from about 7.5 to about 35% by weight elastomeric solids, preferably from about 20% to about 30% by weight. Generally, the variable conductivity range of the material is broader for material with a high loading of carbon, such as 4 to 6 percent by weight, than the material with a low loading of carbon, such as less than 3 percent.

It is unexpected that a slurry or paste of electro-conductive carbon would form micro-agglomerates upon dispersion into an aqueous elastomeric composition. This is believed to occur because of the differential in forces exerted on the carbon particles on the surface of the micro-agglomerates and on the inside of the micro-agglomerates. It has been observed that the addition of a water-miscible carbon-wetting organic solvent to an aqueous surfactant solution has a strong wetting and agglomeration effect on dry undispersed carbon particles when the particles are added to the resulting solution. The water miscible, carbon-wetting organic solvent dissolves some of the surfactant. The solvent and dissolved surfactant are strongly absorbed on the surface of the carbon, thereby altering the surface chemistry of the carbon. The effect is noticeable as a transient stiffening of the wetted mass caused by solvation forces on the large surface area of the exposed carbon. At the peak wetting rate, the solvation forces on the large surface area of the exposed carbon results in a gel-like structure. The wetting of the gel structure, with sufficient wetting liquid present, reaches a saturation point and the carbon becomes more fluid. Thus, when the carbon particles are added to the solvent system, the viscosity of the resulting carbon slurry increases with time to a maximum as the wetting action proceeds. Thereafter, as the wetting action proceeds to equilibrium, the viscosity of the slurry decreases to a steady state value. Equilibrium of the wetting action takes time and the electro-conductive carbon paste is allowed to set for a period of days to reach equilibrium of the wetting action on the carbon particles. It has been found that if slurry or paste is not allowed to approach equilibrium, the dispersion of the paste or slurry into the elastomeric composition causes erratic and unpredictable formation of micro-agglomerates in the elastomeric composition. The wetting of the electro-conductive carbon particles in the preparation of the slurry or paste changes the carbon particles into a conductive mass from a non-conducting uncompressed dry powder. The semi-ordered aggregate condition of wetted and conductive carbon mass in the slurry or paste causes the slurry or paste to be dispersed relatively uniformly under low sheer mixing into the elastomeric composition. By altering the conditions of carbon wetting, that is, by varying the concentration of organic solvent and surfactant in the solvent system and the pH of the carbon slurry, different resistive characteristics and pressure-conductive behaviors are obtained in the pressure sensitive electro-conductive material.

It has been found that the ultra-sonic dispersion of the carbon paste or slurry into the elastomeric composition results in the formation of uniformly sized electro-conductive micro-agglomerates that are easily seen under the microscope as distinct clusters having a diameter between about 0.1 to about 10 microns. The size of the micro-agglomerates is primarily governed by the concentration of the surfactant and water miscible carbon-wetting organic solvent in the carbon slurry and the pH of the slurry. If the carbon particles have not been sufficiently wetted, the micro-agglomerates are not stable and will be broken down by ultrasonic dispersion. Dry carbon will react with the binder or aqueous elastomeric composition to firmly bond carbon particles together, and electrically conductive micro-agglomerates will not form.

To prepare the pressure sensitive, electro-conductive material, the elastomeric-carbon composition is applied as a film to a surface and dried, such as by a commercial type of web coater with drying conditions governed by the drying specifications for the elastomeric composition. It has been found that the elastomeric-carbon composition can be coated, as thin films, onto surfaces as wide or thin strips in width sizes from a fraction of an inch and greater. The dry films are uniform in thickness. For most appliations an elastomeric-carbon composition coating of uniform thickness is desired. Conventional coating methods and equipment well known to the art are used to obtain coatings of uniform thickness. The dried film thickness is not critical and may be tailored for a particular at rest conductance. Dried film thicknesses of from about 0.5 mils to about 10 mils are quite satisfactory; however, thinner or thicker dried film thicknesses would also be satisfactory. The elastomeric-carbon composition can be applied by any of the well-known devices for coating films, such as doctor blades, air knives, reverse roll coaters, meniscus, spray-coaters, roller coaters, dipping tanks, and the like which are suitable for coating relatively low viscosity liquids to provide a metered film thickness. The elastomeric-carbon composition can be coated onto a clean surface, such as the surface of a metal sheet or foil. The composition can also be coated onto a surface coated with a surface relief material, such as Teflon brand polymer, Mylar brand polymer, polyethylene, and the like. The coating is dried to form a film and then peeled away or subjected to a calendering operation to form a precision pressure sensitive electro-conductive film. The dried film can be applied to metal electrodes with or without an electroconductive adhesive. Drying can be accomplished by conventional means, such as hot air, radiant energy, heated rollers, and the like, which are well-known industrial coating operations.

In the drying step, the water and water miscible, carbon-wetting organic solvent are evaporated from the elastomeric-carbon composition leaving unbound electro-conductive carbon black particles enclosed in a matrix of carbon particles bound together by elastomeric composition, that is, the enclosed carbon black particles are free and not bound to other particles and elastomeric compostion. In the dried film, the carbon particles contained in the micro-agglomerates are in a loosely open packed state such that the carbon particles can slide and/or roll past adjoining particles when the micro-agglomerates are compressed. The particles in the micro-agglomerates become more closely packed as the micro-agglomerates are compressed.

The coating coverage of the elastomeric-carbon composition is about 10 square meters per liter of composition and may be significantly more or less depending upon the coated film thickness. The films formed from the compositions are elastic, rubbery, smooth, durable, adherent, and usable in applications at temperatures from −40° C. to +80° C. and in humidity conditions of up to 90% relative humidity at temperatures up to 60° C.

Figure 3:
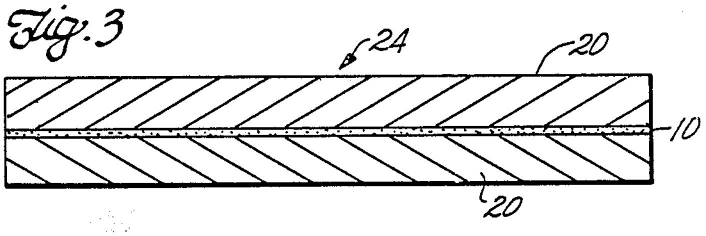
FIG. 3 is a schematic cross-section of a switch employing the pressure sensitive electro-conductive material of the present invention.

Referring to FIG. 3, the pressure sensitive, electro-conductive material 10 is sandwiched between two metal electrodes 20 to form a switch 24. The electrodes can be metal foil, metal sheets, metal plates or the like. Preferably the film is coated on the surface of one electrode and dried. The other electrode is placed on the exposed surface of the dried film to create the pressure sensitive electro-conductive switch 24.

If desired, an electro-conductive adhesive layer (not shown) may be applied to the exposed surface of the pressure sensitive material and/or a surface of electrode 20 to blind the electrode to the dried film 10. The adhesive may be any of those well known in the art. Generally such adhesive is prepared by adding a tackifier to a base material of natural rubber, synthetic rubber, or synthetic resin, which may contain a cross-linking agent, catalyst, etc. Examples of tackifiers are coumarone resins, phenol and terpene resins, petroleum hydrocarbon resins, and resin derivatives. Such rubber-based adhesives are well known in the art. The adhesives contain fine particles of electro-conductive metal in the amounts of about 10 to about 100 parts by weight of metal per 100 parts by weight of rubber-based adhesive material. The thickness of such adhesive layer is not critical but is preferably from about 30 to about 200 microns. The electro-conductive rubber-based adhesives can be used to bind the electrode to the film.

Figure 4:
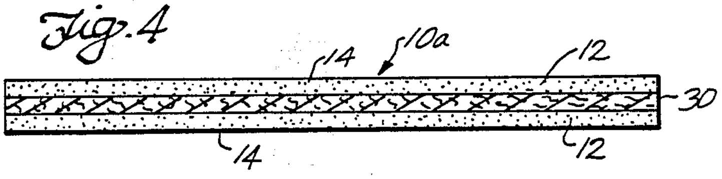
FIG. 4 is a schematic cross-section of an alternate embodiment of the electro-conductive material of this invention.

If desired, a thin layer or film of the elastomeric-carbon composition can be coated on each side of a porous, support layer to strengthen the pressure sensitive, electro-conductive material. For example, as shown in FIG. 4, a porous support layer 30 is impregnated with the elastomeric-carbon composition so that a dried film of pressure sensitive electro-conductive material 10*a* is on both sides of the layer and the composition within the fibrous matrix of the layer is a single homogenous mass. The layer 30 can be a woven fabric, knit fabric, or non-woven porous fabric prepared from conventional fibers such as cotton, nylon, vinylon, polyester, cellulose, rayon, and other natural and synthetic fibers. Preferably, the thickness of such a layer 30 is between about 100 and about 300 microns.

If desired, the coated film may be heated both for drying and cross linking or vulcanization. The heat treatment can be effected in a conventional manner known for vulcanization. Thus, the film may be heated to 100° C. to 150° C. by steam or hot air to complete the vulcanization or cross linking.

The products of the invention produce greater conductivity under pressure than products with the same proportion of electro-conductive carbon black inclusions. However, the elastomeric coating is not as good a conductor as the electro-conductive carbon black particles themselves. The area of contact and the number of possible conductive paths is increased considerably when two of the micro-agglomerates come into contact. Results can be visualized as similar to that of two balloons being pressed together, each balloon representing a micro-agglomerate. As the balloons are pressed together, the area of contact between the balloons increases. An additional effect occurs when pressure is applied to the material and then released. The conductivity of the material abruptly decreases with little, if any, tendency toward arcing between adjacent micro-agglomerates. This occurs because the micro-agglomerates are generally spherical in shape, and the electrons are spread over the large surface areas of the micro-agglomerates rather than concentrated at points or edges, as is the case with individual carbon black particles. It is believed that the short life of some pressure sensitive elastomers containing metallic particles with sharp or angular points or edges can be attributed to micro-arcing occurring when conducting particles are separated upon releasing the pressure of the deformable material containing the metal particles which keeps the particles in contact. The micro-arcing results in oxidation and erosion at the arcing point or edges.

The micro-agglomerates in the material of the present invention have a flexibility not possessed by electro-conductive particles. The present material has a long life expectancy. When pressure is applied to the present material, the micro-agglomerates can be compressed and do little, if any, injury to the internal structure of the elastomeric component of the material as sharp edged particles tend to do.

The micro-agglomerates of the present invention cannot be compared to the extremely fine electro-conductive carbon black particles which are conventionally added to elastomeric materials as the conductive particles. In addition, the dendritic paths of extremely fine carbon particles which form the conducting path in carbon filled elastomers are far more fragile than the conduction paths formed by the micro-agglomerates.

Figure 5:
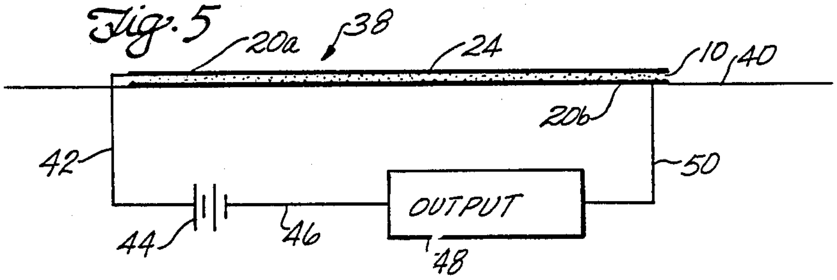
FIG. 5 is a schematic plan of a circuit employing a switch of this invention.

An exemplary embodiment of an electrical system or apparatus 38 provided in accordance with the practice of this invention is illustrated in FIG. 5. The electrical apparatus is utilized to carry out a pre-determined operation, such as detecting and signalling the opening of a door, that is at least partially controlled by the pressure sensitive electro-conductive switch of the present invention. The system or apparatus comprises the pressure sensitive electro-conductive switch 24, such as the switch of FIG. 3, mounted on a platform 40, such as a floor. A lead 42 electrically connects one electrode 20*a* with one pole of a battery or voltage source 44. A lead 46 electrically connects the other pole of the battery to an electrical powered output device 48. A lead 50 electrically connects the output device 48 to the other electrode 20*b* of the switch. The system 38 can be utilized as an intruder detection device wherein the switch is secured to a floor at a doorway, in a hall, on a staircase, beneath a window, or the like. The switch can be hidden beneath a carpet or rug. When a person or animal steps on the switch, the circuit is closed and the battery energizes the electrical powered output device, which can be an alarm, or a control device for closing and/or locking doors and windows, or a switch device for turning on lights, or the like. The system can be a counter system to determine the number of people, vehicles, and the like, which encroach or cross on the switch. In such a system the electrical powered output device will be a conventional electronic counter well known in the art.

The following examples 1 through 4 illustrate electro-conductive carbon compositions used to form the elastomeric-carbon compositions of the present invention. The grade of electro-conductive carbon used in the following examples is Vulcan XC-72R brand conductive carbon black available from the Cabot Corporation. The specifications for this brand of electro-conductive carbon are: (a) particle size, about 30 millimicrons (arithmetic mean diameters); oil (DBP) absorption, 185 (fluffy) and 178 (pellets) cc per 100 grams; volatile content, 0.5%; fixed carbon, 98.5%; surface pH, 5.0; and, apparent density, 6 (fluffy) and 16 (pellets) lbs. per cubic foot. Other electro-conductive carbon blacks may be employed equally as well, such as Cabot Corporation's Black Pearl 2000, Vulcan XC-72 and Vulcan P conductive carbon black. The preferred conductive carbon has a fluffy form.

EXAMPLE 1

An aqueous slurry of carbon black was prepared from the following ingredients in the specified amounts:

| | |
|---|---|
| Water | 190.0 grams |
| Sodium Metasilicate | 1.0 grams |
| Diethylene Glycol Butyl Ether | 5.7 grams |
| Methyl Diethanol Amine | 2.0 grams |
| Pluronic F108 Surfactant | 0.50 grams |
| Vulcan CX-72R Conductive carbon black | 30.0 grams |
| TOTAL | 228.50 grams |

The above-named ingredients were added sequentially and thoroughly dissolved before the next ingredient was added. The carbon was added last into the aqueous solvent system and dispersed therein with stirring to form an electro-conductive carbon slurry. The slurry was allowed to soak for forty-eight hours to form a uniform slurry with thoroughly wetted carbon particles.

EXAMPLE 2

An electro-conductive carbon slurry was prepared from the following ingredients in the specified amounts:

| | |
|---|---|
| Water | 190.0 grams |
| Sodium Metasilicate | 1.0 grams |
| Diethylene Glycol Butyl Ether | 5.0 grams |
| Methyl Diethynol Amine | 2.0 grams |
| Pluronic L62 surfactant | 0.10 grams |
| Vulcan XC-72R carbon black | 30.0 grams |
| TOTAL | 228.1 grams |

The electro-conductive carbon slurry was prepared in the same manner (mixing procedure) as the slurry in Example 1.

EXAMPLE 3

An electro-conductive carbon slurry was prepared from the following ingredients in the specified amounts:

| | |
|---|---|
| Fantastic brand household cleaner | 200.0 grams |
| Vulcan XC-72R Conductive Carbon | 30.0 grams |
| TOTAL | 230.0 grams |

Fantastic brand household cleaner is a product of Texize of Greenville, S.C., a division of Morton Thiokol, Inc. Fantastic brand household cleaner is composed of water, a water miscible, carbon wetting organic solvent, a surfactant, and base ingredients. The Fantastic household cleaner can be used as commercially sold to prepare the electro-conductive slurry. The cleaner was measured out in the prescribed amount and electro-conductive carbon black was added with stirring to form the slurry. The slurry was allowed to soak or stand for three days.

EXAMPLE 4

An electro-conductive carbon slurry was prepared from the following ingredients in the amounts specified:

| | |
|---|---|
| Water | 260 grams |
| Fantastic brand household cleaner | 50 grams |
| Vulcan XC-72R electro-conductive carbon black | 30 grams |
| TOTAL | 340 grams |

The electro-conductive carbon slurry of this example was prepared in the same manner as the slurry of Example 3. This example illustrates the use of a minimum quantity of surfactant and a water miscible, carbon wetting, organic solvent for the preparation of a slurry. It was found that the slurry, because of its minimum quantity of surfactant and organic solvent, required the longest standing or soaking time to properly wet the carbon particles for the preparation of the elastomeric-carbon composition. The slurry prepared in accordance with this Example 4 required five to seven days for adequate carbon particle wetting.

The following materials are used to make the elastomeric-carbon compositions described in the following examples:

Witcobond W-240 aqueous polyurethane dispersion supplied by the Witco Chemical Corporation, New York, N.Y.;

NeoRez R-963 aqueous aliphatic polyurethane dispersion supplied by the Polyvinyl Chemical Industries of Wilmington, Mass.;

Ganex P-904 alkylated polyvinylpyrrolidone powder supplied by the GAF Corporation of New York, N.Y.;

Carboset 514-H aqueous pigment dispersant supplied by the B. F. Goodrich Corporation of Cleveland, Ohio;

Colloid 694 defoamer supplied by Colloids, Inc., of Richmond, Calif.; and

Aerosil COK 84 thickener for latexes supplied by Degussa, Inc. of Teterboro, N.J.

The pH of the polyurethane, and aliphatic polyurethane dispersions was adjusted to a pH of 9.0 to 10.0 by the addition of ammonium hydroxide and methyl diethanol amine to dispersions. The ammonia is added to a 30% solid dispersion at the rate of about 3 grams of the ammonia solution (concentrate) per 300 grams of dispersion. Methyl diethanol amine is added to the aqueous resin dispersion at the rate of about 2 grams of methyl diethanol amine to each 300 grams of aqueous resin dispersion.

Witco W-240 is a self-crosslinking, aqueous polyurethane dispersion. The crosslinking occurs during the drying cycle. Maximum film properties are obtainable after two minutes when heated to a temperature between 82° and 107° C. with a nominal heating time of 3 minutes at 99° C. The particle charge is anionic, and the particles size is in the colloidal range. The pH of the dispersion at 25° C. is 8.0, the glass transition temperature (Tg) is −53° C., the organic volatiles weight is 12.3% by weight, solids content is 30% by weight of the dispersion, and viscosity at 25%C is less than 50 cps.

Examples 5–12 below set forth elastomeric-carbon compositions that were prepared with the electro-conductive carbon slurries prepared in examples 1 through 4 and the specified elastomeric compositions after pH adjustments and the addition of aqueous pigment dispersants. The carbon slurry was added and dispersed into the elastomeric composition after the pH adjustment and the addition of the aqueous pigment dispersants. The carbon was dispersed in the elastomeric composition with ultrasonic dispersion. In examples 5–12, a type Airbic 1 45 S4 Ultra-Turrax 600 watt general purpose blender of Janke Kunkel KG, IKA-WERK was used. All of the elastomeric-carbon compositions were prepared in 800 ml. disposable plastic beakers. A Tekmar TR-10 power control was set at moderate speed of about 50 and turned to the first resonant level for actuation of the above-identified ultrasonic blender. The elastomeric-carbon compositions were subject to ultrasonic dispersion for ten minutes. Care was taken to exclude the entrainment of air in the composition. Heating of the compositions during ultrasonic dispersion was kept at a minimum. When the dispersion was not as uniform as desired, the ultrasonic dispersion time was extended, but not to the point of entraining air in the composition. A small amount of anti-foam was added to the composition as needed near the end of the ultrasonic dispersion to reduce bubble formation.

The resistivity responses of films prepared from the elastomeric-carbon compositions of Examples 6, 9 and 10 were measured with a conventional analog ohmmeter and field effect transistor high impedance digital ohm meter (FET meter). The analog meter measured the resistivity response for high current signals (0.1 to 1 milliamp current) and the digital meter measured the resistivity response for low current signals (10–100 nanoamps).

EXAMPLE 5

The following ingredients were added sequentially and dispersed as described above:

| | |
|---|---|
| Witcobond W-240 aqueous polyurethane dispersion with 3 grams of concentrated ammonia | 300 grams |
| Carboset 514-H aqueous pigment dispersant | 5 grams |
| Electro-conductive carbon slurry of Example 1 | 90 grams |
| TOTAL | 395 grams |

The Carboset 514-H was mixed into the Witcobond W-240 and allowed to set over night. The carbon slurry of Example 1 was added and dispersed into the elastomeric composition as described above. After the ultrasonic dispersion, the resulting elastomeric-carbon composition was allowed to cool to room temperature, coated on a polyester based aluminum foil (5 mil, 10 square feet) on a web-type coater, hot air dried, and cured at a temperature between about 200 and about 209° F. for three minutes using radiant heat. The resulting film had a thickness of from about 0.9 to about 1 mil. A 3 square foot aluminum foil was placed on a portion of the exposed film. This same procedure was repeated for Examples 6 through 12 except where otherwise indicated.

EXAMPLE 6

The following ingredients were used to prepare elastomeric-carbon compositions in accordance with the procedure of Example 5:

| | |
|---|---|
| Witcobond W-240 aqueous polyurethane dispersion with 3 grams of concentrated ammonia | 300 grams |
| Ganex T-904 aqueous pigment dispersant | 2 grams |
| Electro-conductive carbon slurry of Example 1 | 90 grams |
| TOTAL | 392 grams |

Figure 6:
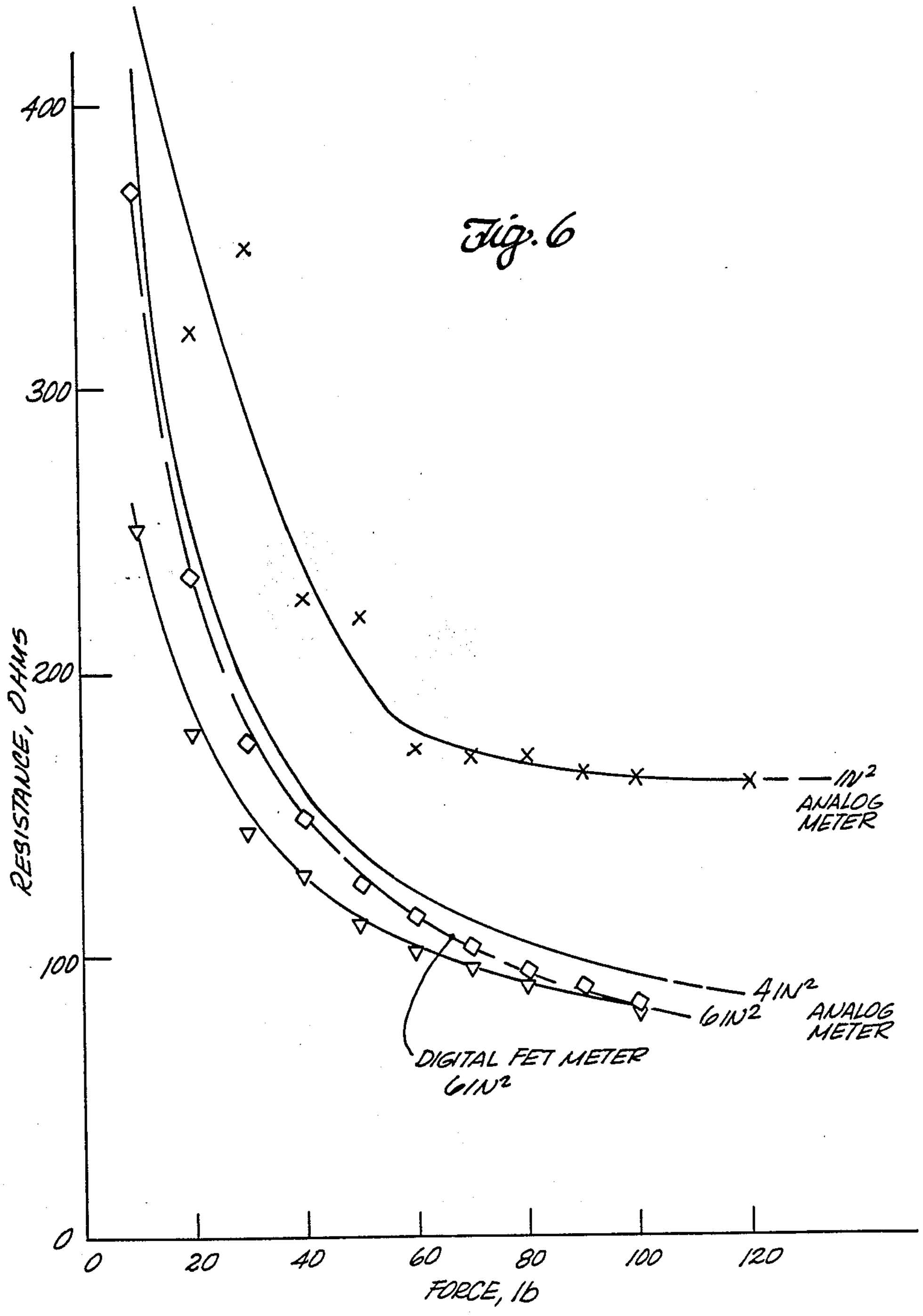
FIG. 6 is a graph depicting the resistivity of a pressure sensitive electro-conductive material of the present invention with low resistivity under different pressures (pounds per 4 square inches and 6 square inches)

Films prepared from this elastomeric composition have low resistivity. The resistivity response of one film under different pressures is shown in FIG. 6. The resistivity response of the film is dependent upon force and area. The film is very responsive to changes in pressures between about 20 and 60 pounds per square inch, 20 and 60 pounds per 4 square inches, and 20 and 60 pounds per 6 square inches.

EXAMPLE 7

The following ingredients were used to prepare elastomeric-carbon compositions in accordance with the procedure of Example 5:

| | |
|---|---|
| Witcobond W-240 aqueous polyurethane dispersant with 3 grams of concentrated ammonia | 300 grams |
| Carboset 514-H aqueous pigment dispersant | 5 grams |
| Electro-conductive carbon slurry of Example 2 | 90 grams |
| TOTAL | 395 grams |

-continued

EXAMPLE 8

The following ingredients were used to prepare elastomeric-carbon compositions in accordance with the procedure of Example 5:

| | |
|---|---|
| Witco W-240 aqueous polyurethane dispersant with 3 grams of concentrated ammonia | 300 grams |
| Ganex T-904 aqueous pigment dispersant | 2 grams |
| Electro-conductive carbon slurry of Example 2 | 90 grams |
| TOTAL | 392 grams |

EXAMPLE 9

The following ingredients were used to prepare elastomeric-carbon compositions in accordance with the procedure of Example 5:

| | |
|---|---|
| Witco W-240 aqueous polyurethane dispersant with 3 grams of concentrated ammonia | 240 grams |
| NeoRez 963 aqueous polyvinyl dispersant | 60 grams |
| Electro-conductive carbon slurry of Example 3 | 90 grams |
| TOTAL | 390 grams |

Figure 8:
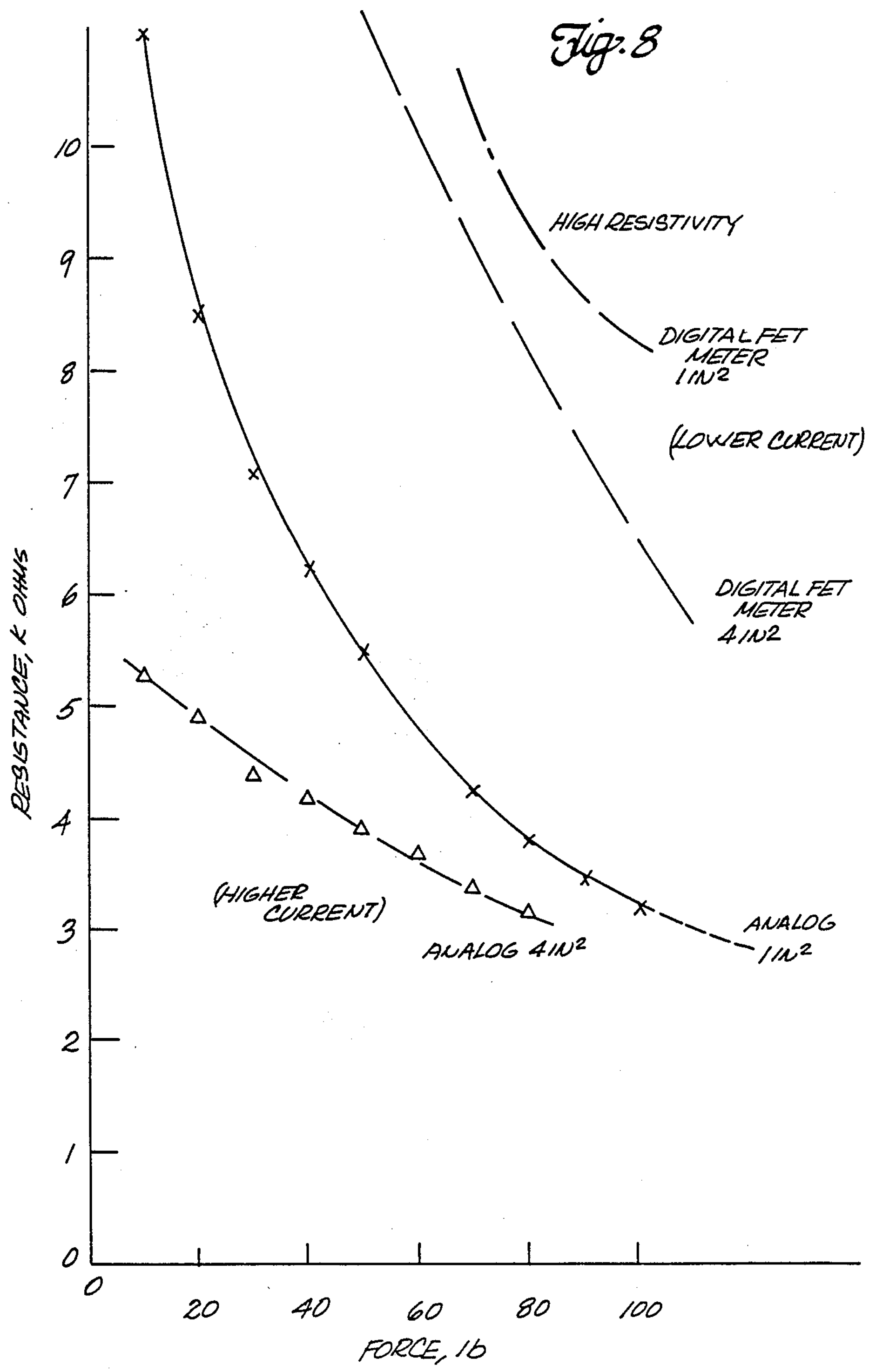
FIG. 8 is a graph depicting the resistivity of a pressure sensitive electro-conductive material of the present invention with high resistivity under different pressure (pounds per 1 square inch and 4 square inches).

Films formed from this composition have relatively high resistivities. The resistivity of one film to different pressures is shown in FIG. 8. The resistivity of the film is higher for low current (10–100 nanoamps) than high current (10,000–100,000 nanoamps). The film has a substantially linear resistivity response to force applied to a large area, that is 4 square inches or more, and can be used as a transducer for a weighing device.

EXAMPLE 10

The following ingredients were used to prepare elastomeric-carbon compositions in accordance with the procedure of Example 5:

| | |
|---|---|
| Witco W-240 aqueous polyurethane dispersant with 2 grams of methyl diethanol amine | 300 grams |
| Aerosil COK 84 aqueous latex thickener | 5 grams |
| Electro-conductive carbon slurry of Example 3 | 90 grams |
| Colloid 694 anti-foaming agent | 1 drop |

In the preparation of the elastomeric-carbon composition of this Example 10, the Aerosil aqueous latex thickener was mixed into the Witcobond W-240 aqueous polyurethane dispersant and allowed to stand for three to four hours. The carbon was dispersed into the resulting composition, and the colloid 694 anti-foaming agent was added, when there were indications that the resulting composition was commencing to foam. The anti-foaming agent was added towards the end of mixing only to the top layers of the composition where the bubbles are concentrated. When the dispersion operation was complete, the elastomeric-carbon composition was poured from the bottom of the beaker to exclude foaming material from the coating operation.

Figure 7:
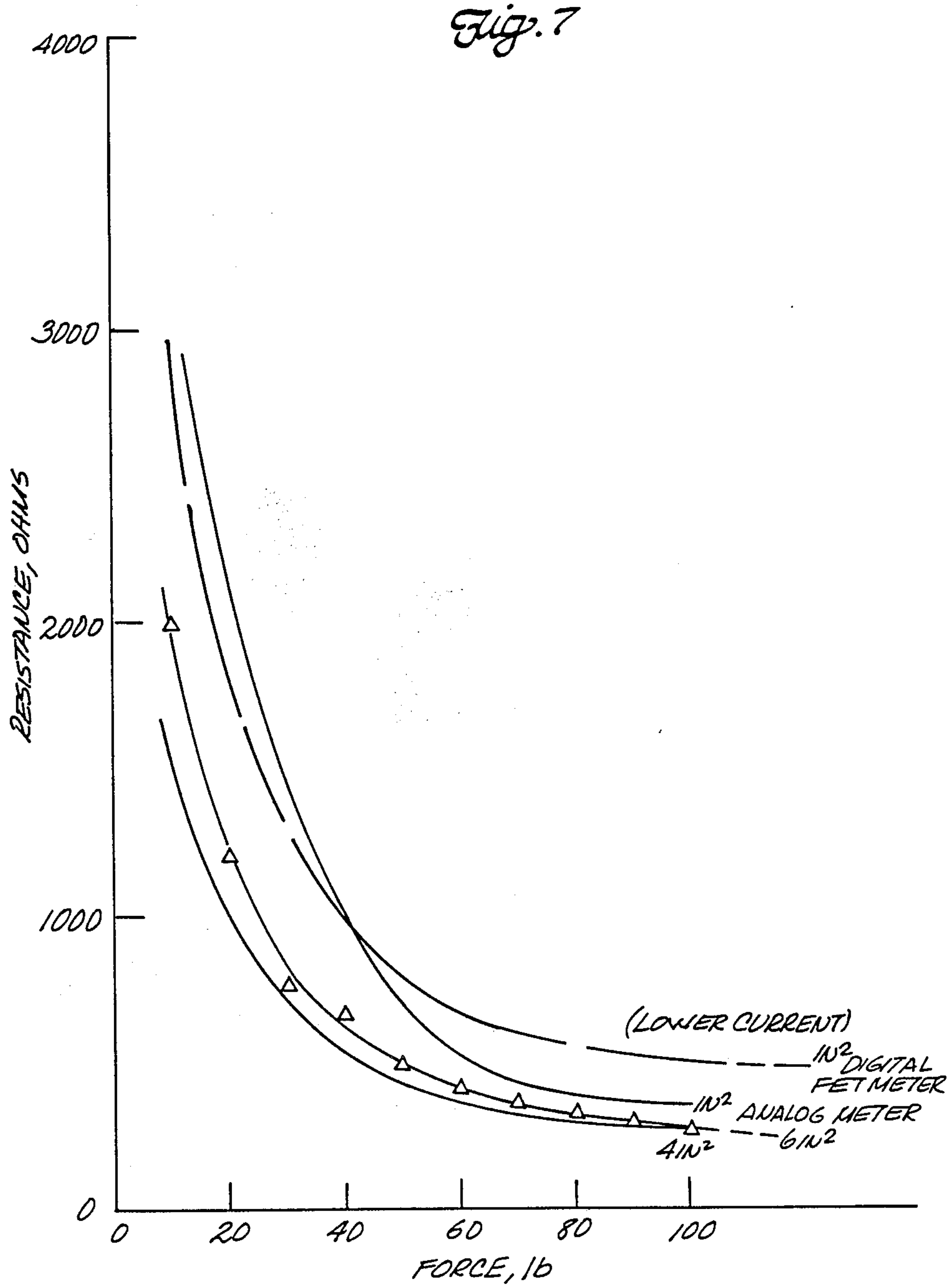
FIG. 7 is a graph depicting the resistivity of a pressure sensitive electro-conductive material of the present invention with intermediate resistivity under different pressures (pounds per 1 square inch and 4 square inches)

Films prepared from this composition have an intermediate resistivity. The resistivity response of one film under different pressures is shown in FIG. 7. The film is very responsive to changes in pressure between about 10 and 40 pounds per 6 square inches, about 10 and 40 pounds per 4 square inches, and about 10 and 60 pounds per 1 square inch.

EXAMPLE 11

The following ingredients were used to prepare elastomeric-carbon compositions in accordance with the procedure of Example 5:

| | |
|---|---|
| Witcobond W-240 with 2 grams of methyl diethanol amine | 240 grams |
| NeoRez 963 | 60 grams |
| Electro-conductive carbon slurry of Example 4 | 135 grams |
| TOTAL | 435 grams |

EXAMPLE 12

The following ingredients were used to prepare elastomeric-carbon compositions in accordance with the procedure of Example 5:

| | |
|---|---|
| Witcobond W-240 with 2 grams of methyl diethanol amine | 300 grams |
| Aerosil COK 84 | 5 grams |
| Electro-conductive carbon slurry of Example 4 | 135 grams |
| TOTAL | 440 grams |

In this Example 12, the Aerosil COK 84 aqueous latex thickener was added to the aqueous polyurethane dispersant allowed to stand for three to four hours before the addition of the carbon slurry. The use of an anti-foaming agent is optional.

EXAMPLE 13

The switches of Examples 5 through 12 were tested to determine the at rest resistance of the pressure sensitive electro-conductive material and the response of the material to a force. The test results are set forth in Table I below. Each switch has a bottom aluminum electrode (10 square feet) and a top aluminum electrode (3 square feet). The bottom electrode was connected to one pole of a high impedance ohm meter and the top electrode was connected to the other pole of the meter. Several ohm readings were taken for each switch at rest and under load. The elastomeric-carbon composition of Example 12 was also coated on paper (aluminum) foil. After the film had dried, the exposed surface was covered with paper (aluminum) foil. The pressure sensitive electro-conductive material was in contact with the aluminum of the paper (aluminum) foil. Several ohm readings were taken for this switch. The resistance data of the switches is set forth below. The resistance of the aluminum and paper (aluminum) foil approached zero. Thus the resistance data relates to the resistance and pressure sensitive properties of the pressure sensitive electro-conductive material of the switches.

TABLE I

| Material of Example Number | At Rest Resistance in ohms (no load) | Load Resistance, in ohms, 175 lbs. (Human) | Load Resistance, in ohms, 10-15 lbs. (Cat) |
|---|---|---|---|
| 5 | 1.5K-2K | 1.7-1.9 | 35-45 |
| 6 | 15K-20K | 5.5-7 | 100-115 |
| 7 | 1.8K-2.5K | 2.1-2.5 | 25-35 |
| 8 | 700-720 M | 2.6-10K | 3K-720 M |
| 9 | 100-250K | Ave 145 225 lb-120 | 450-1000 |
| 10 | 50-100K | 18-21 | 220-350 |
| 11 | 550-2K | 2.4-1.8 | 13-15 |
| 12 | 3-10K | 1.5-1.8 | 10-25 |
| 12 (on paper foil) | 4-15K | 2.5 | |

The above description of preferred embodiments of pressure sensitive electro-conductive materials provided in accordance with practice of principles of this invention are for illustration purposes. Because of variations which will be apparent to those skilled in the art, the present invention is not intended to be limited to the particular embodiments described above. The scope of the invention is defined in the following claims.

What is claimed is:

1. Electrically conductive micro-agglomerates of unbound finely divided electro-conductive carbon particles enclosed by a matrix of elastomeric material and finely divided electro-conductive carbon particles bound together by the elastomeric material, the maximum dimension of said microagglomerates being between about 0.1 and about 10 microns.

2. The micro-agglomerate of claim 1, wherein the finely divided electro-conductive carbon particles have a size of from about 15 millimicrons to about 75 millimicrons.

3. A pressure sensitive electro-conductive material comprising a plurality of electrically conductive micro-agglomerates dispersed in an elastomeric medium, the micro-agglomerates comprising unbound finely divided electro-conductive carbon particles enclosed by a matrix of said elastomeric material and finely divided electro-conductive carbon particles bound together by the elastomeric material.

4. The pressure sensitive electro-conductive material according to claim 3 wherein the maximum dimension of said micro-agglomerates is between about 0.3 and about 2 microns.

5. The pressure sensitive electro-conductive material according to claim 4 wherein the finely divided electro-conductive carbon particles have a size of from about 15 millimicrons to about 75 millimicrons.

6. The pressure sensitive electro-conductive material according to claim 3 wherein the elastomeric medium is a polyurethane material.

7. A pressure sensitive electro-conductive switch comprising first and second electrodes, and a deformable pressure sensitive electro-conductive material sandwiched between said first and second electrodes, said material comprising an elastomeric material impregnated with electrically conductive micro-agglomerates of unbound finely divided carbon particles enclosed by a matrix of the elastomeric material and finely divided electro-conductive carbon particles bound together by the elastomeric material.

8. The switch according to claim 7 wherein the pressure sensitive electro-conductive material is in the form of a thin film sandwiched between said first and second electrodes.

9. An electrical apparatus for carrying out a predetermined operation that is at least partially controlled by a pressure sensitive electro-conductive switch comprising:

electrical powered output means for powering a system of said apparatus;

voltage source for energizing said electrical powered output means;

pressure sensitive electro-conductive switch means connected to said electrical powered output means and said voltage source to switch the flow of electrical current from said voltage source to said electrical powered output means to carry out a predetermined operation, said switch means comprising first and second electrodes, and a deformable pressure sensitive electro-conductive material sandwiched between said first and second electrodes, said material comprising a matrix of an elastomeric material and electrically conductive micro-agglomerates, wherein the micro-agglomerates comprise unbound finely divided electro-conductive carbon particles enclosed by the elastomeric material and finely divided electrically-conductive carbon particles bound together by the elastomeric material.

* * * * *